United States Patent [19]

Körtvélyessy

[11] Patent Number: 5,675,118
[45] Date of Patent: Oct. 7, 1997

[54] THERMO-COUPLE WITH LINEAR DRIFT FOR LIQUID STEEL

[76] Inventor: Làszló Körtvélyessy, Klever Berg 21, D-4190 Kleve, Germany

[21] Appl. No.: 969,278
[22] PCT Filed: May 22, 1991
[86] PCT No.: PCT/EP91/00958
§ 371 Date: Jan. 22, 1993
§ 102(e) Date: Jan. 22, 1993
[87] PCT Pub. No.: WO91/18269
PCT Pub. Date: Nov. 28, 1991

[30] Foreign Application Priority Data

May 22, 1990 [DE] Germany ............ 40 16 404.7

[51] Int. Cl.⁶ ................................. H01L 35/02
[52] U.S. Cl. .................. 136/234; 136/230; 136/232; 136/233; 374/179; 374/208
[58] Field of Search .................. 136/230, 232, 136/233, 234; 374/179, 208

[56] References Cited

U.S. PATENT DOCUMENTS

| | | | |
|---|---|---|---|
| 2,177,033 | 10/1939 | Buell | 136/4 |
| 3,011,006 | 11/1961 | Nicholson et al. | 136/5 |
| 3,680,382 | 8/1972 | Vaiden | 73/343 R |
| 3,757,206 | 9/1973 | Dorst | 324/32 |
| 4,137,768 | 2/1979 | Tushie et al. | 73/343 R |
| 4,428,686 | 1/1984 | Brax | 374/179 |
| 4,721,533 | 1/1988 | Phillippi et al. | 136/234 |
| 4,721,534 | 1/1988 | Phillippi et al. | 136/234 |
| 4,746,534 | 5/1988 | Phillippi et al. | 427/37 |
| 4,830,515 | 5/1989 | Cortes | 374/208 |
| 5,137,582 | 8/1992 | Kasman | 136/233 |
| 5,181,779 | 1/1993 | Shia et al. | 374/139 |

FOREIGN PATENT DOCUMENTS

| 901657 | 7/1962 | European Pat. Off. |
| 3045652 | 7/1982 | Germany |

Primary Examiner—Charles T. Jordan
Assistant Examiner—Chrisman D. Carroll
Attorney, Agent, or Firm—Cushman, Darby & Cushman; IP Group of Pillsbury Madison & Sutro LLP

[57] ABSTRACT

Continuous temperature measurement for liquid steel has in the past been made only with a thermocouple with exponential drift. With a diameter ratio of about 2 between metal and ceramic wells and with exceptionally thin electrical insulation, a lower, calculable linear drift can be achieved thus giving a substantially longer service life.

6 Claims, 2 Drawing Sheets

THERMO-COUPLE WITH LINEAR DRIFT FOR LIQUID STEEL

BACKGROUND OF THE INVENTION

1. Field of the Invention

This invention relates to the continuous temperature measurement of liquid steels, but also to all high temperature thermo-couples with an outer metal protective tube, and an inner ceramic protective tube.

2. Description of the Related Art

State of the art are thermo-couple tips made of platinum-rhodium-platinum that indicate, when submerged into liquid steel, the temperature of the melt for several seconds and afterwards dissolve in the steel.

Furthermore state-of-the-art are thermo-couples according to the U.S. Pat. Nos. 4,746,534, 4,721,534, 4,721,533.

They describe a thermo-couple with three protective tubes:

1. An outermost argillacious earth-graphite protective tube (61%–35%, plus stabilizers) that can be submerged directly into the liquid steel. This protective tube is exchangeable.
2. An outer protective tube made of pure molybdenum.
3. An inner protective tube made of pure argillacious earth with the usual two hole insulation rod and thermowires.

The outermost protective tube is relatively inexpensive, but only lasts for one casting sequence. In other words it only lasts for one heating and cooling process, less than one day.

The two hole insulation rod is as pure and thick as possible, because the temperatures of 1530°–1550° C. are so high, that, as is commonly known, a thin insulation would start to conduct electricity and thereby cause a too low indication.

Said thermo-couples were the first, that made a continuous measurement of the temperature of liquid steel possible. This is very important with continuous casting devices. At a too low temperature the casting operation has to be stopped.

The problem of the above described continuous thermo-couple is however, that it falsely starts to indicate the too low temperature already after about three days, although the temperature is still sufficiently above the liquidus temperature (i.e. around 3K). This drift increases according to an exponential function as is shown in FIG. 1 according to an actual measurement. The thermo voltage collapses at an increasing speed.

The drift at temperatures that high is something natural. It can easily be checked through submerge-measurements in intervals of 10 minutes. If t is the time in hours, the Delta T drift according to an exponential function Delta T=-A exp bt is an important condition of operation.

The accuracy of measurement in the beginning is of particular advantage. The drift remains almost immeasurably small.

After several days, however, a clearly negative drift appears. After having shown up for the first time, it becomes more and more severe. FIG. 1 shows, that the apparent change of temperature of the liquid steel amounts to over 1 Kelvin per hour after the thermo-couple has been in use for 90 hours. The thermo-couple had to be exchanged. Thus the staff was exposed to the strong temperature radiation and to the danger of injury.

Therefore, the advantage of the small drift in the beginning is only of value for a short time. The drift becomes more uncalculable the longer the thermocouple is in use. The drift curve according to FIG. 1 can depend on metal vapors, reactions within the ceramic and on the natural Rhodium diffusions within the thermo-wires.

SUMMARY OF THE INVENTION

The drift curve shows a process, which takes place faster and faster; for example, a collapse of the insulation resistance. The solution to this problem was achieved through a surprisingly simple way, namely through a measure that surely no expert could have foreseen:

the insulation layer between the two thermo wires was not further increased—as every expert would have recommended—to prevent the collapse of the termo voltage. On the contrary: the insulation layer was reduced very much; namely to only 0.2 mm (max. 0.5 mm).

Even only one thermo wire was electrically insulated namely through a one hole insulation rod, while the other thermo wire was freely located in the fitting ceramic protective tube.

DETAILED DESCRIPTION OF THE PRESENTLY PREFERRED EXEMPLARY EMBODIMENT

Figure 1:
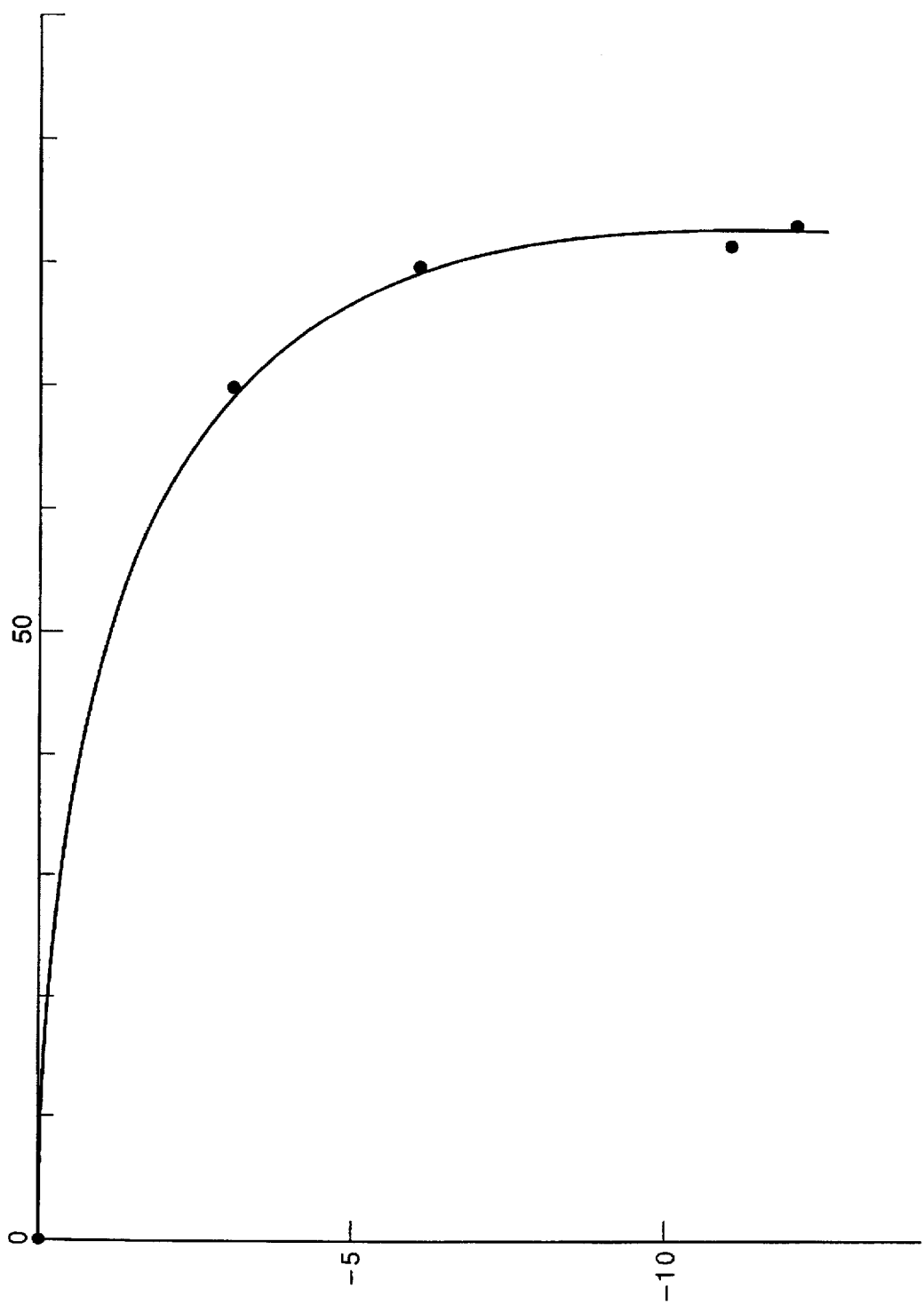
FIG. 1 is a graph showing drift over time.

Experiments showed, that it is better to keep the old molybdenum protective tube, than to adapt it to the new, very thin ceramic protective tube. The drift was at best, when the following relationship existed for the diameter proportion V:

$$V = \frac{D}{d} \approx 2$$

or if $$\max 1.5 \leq V < 3$$

wherein D is the inner diameter of the metal protective tube and d is the outer diameter of the ceramic protective tube.

The immersion measurements show that the previously unavoidable exponential drift has become almost linear.

The reason maybe the greater distance between the metal and the ceramic protective tube. Thus it is possible that an attack on the electrical ceramic insulation did not happen.

It is true that the linear drift is somewhat greater after a day than the exponential drift, but it still remains calculable. After several days, the linear drift is clearly less than the previously unavoidable exponential drift.

This linear drift can be even more reduced by improving the diameter proportions of the thermowires (DE P 30 45 652.1). Therefore the negative thermowire has to be chosen thicker than the positive. Generally speaking, the diameter ratio of both thermo wires has to be adjusted in such a way, that under the same circumstances both thermowires show the same drift at operating temperature.

There is something similar to be observed in both of these inventions. The present invention recommends to optimize the diameters of two concentric protection tubes to reduce the drift of the thermo-couple in them. An earlier invention of 1980 recommends to optimize the diameters of the two thermo wires of a thermo-couple for the same purpose. Normally the outer metal protective tube of a thermo-couple holds an inner ceramic protective tube without any device to hold the distance. The protective tubes are adapted to one another.

In this new thermo-couple, however, according to the above mentioned equation, the ceramic protective tube has to be centered, to avoid damage during transport or during operation.

According to the invention one or more elastic short tubes are used in the vicinity of the thermo-couple head or at the location of the thermo-couple, that is relatively cool during operation. Its outer diameter is D, and its inner diameter is d. The material to be considered is silicone rubber.

In this case it is often of advantage, not to use common O-rings, since the short tubes fix the inner tube within the metal protective tube even against axial movement.

According to the invention the ceramic protective tube should be placed close to the end of the metal protective tube with its closed end during this centering operation. Thus, the ceramic protective tube is being fixed at two ends during the transport, when greater accelerations occur.

After being submerged into the melt the metal protective tube expands much more than the ceramic protective tube. Thus, the ceramic protective tube remains hanging inside the metal protective tube without movement, only subjected to the force of gravity.

After removal the metal protective tube assumes its original length, whereby the ceramic protective tube becomes fixed at two ends again, and thus can be transported without any danger. When the inventive thermo-couple is used for the continuous measurement of liquid steel, it should not simply be plugged into the outer argillacious earth-graphite protective tube. In accordance with the invention, the new thermo-couple itself should be placed in the outer protective tube with a centering device. The latter can be formed as a cone or a cylinder with covering discs. This centering device should fix the metal protective tube in such a way, that even at the highest operating temperature, it does not reach the close end of the outer argillacious earth-graphite protective tube.

Figure 2:
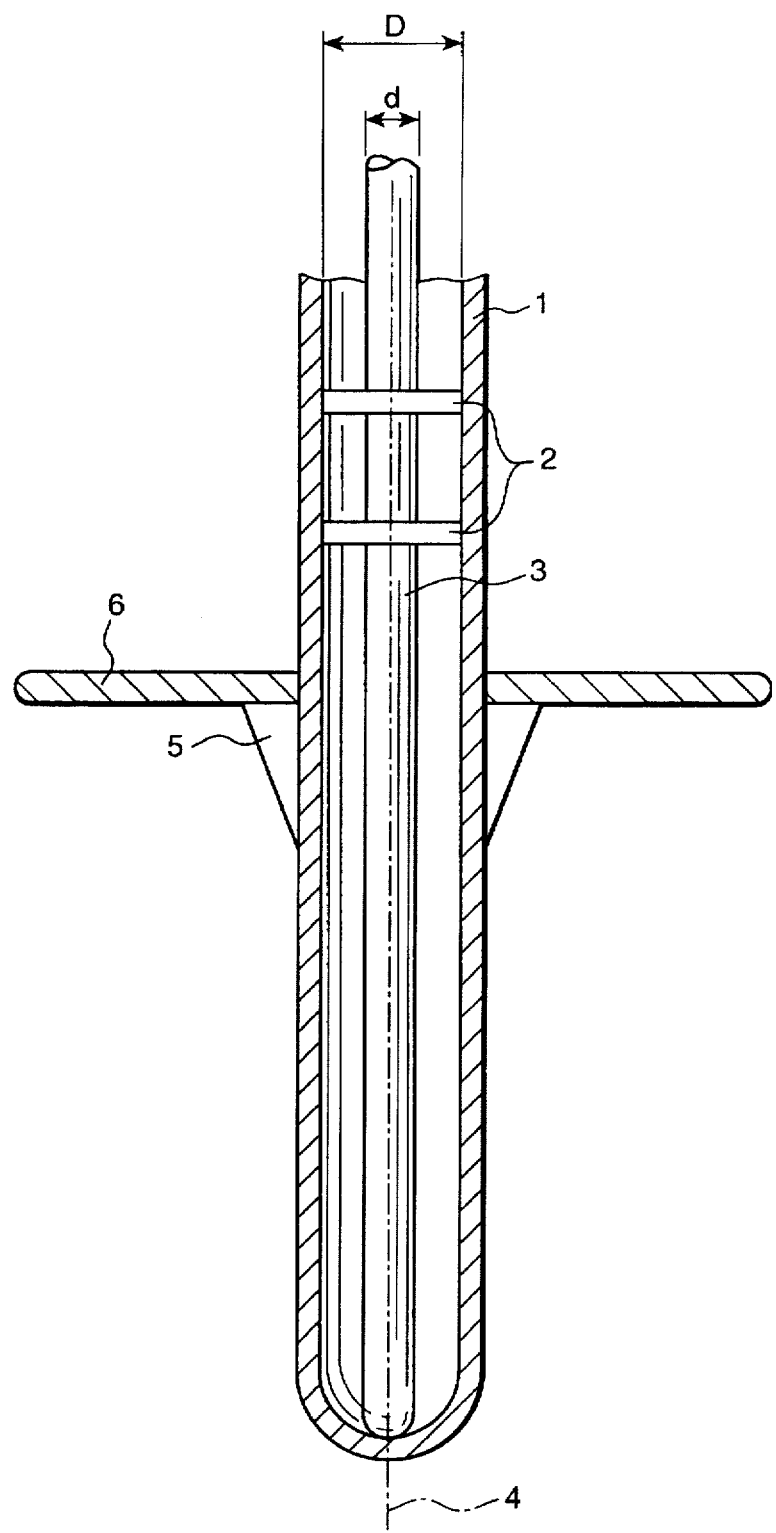
FIG. 2 is a schematic elevational view of a thermo-couple provided in accordance with the present invention.

A possible embodiment of the invention is pictured in FIG. 2. The outer metal protective tube (1) (with an inner diameter D), supports, together with the two short tubes (2), the thin ceramic protective tube (3) (with an outer diameter d). The ceramic protective tube (3) is located in a cold state at point 4 on the inner top of the metal protective tube (1). A possible centering device is composed of a cone (5) and a disc (6), that are either screwed, welded or otherwise fixed to the metal protective tube (1).

Advantages of This Invention Are

1. The Lifetime is longer than one week.
2. The drift is calculable. It can easily be controlled by the casting computer.
3. Less thermo-couple tips are consumed during a single measurement of liquid steel.
4. The thermo-couple is light, and can practically be produced without tools.
5. The valuable Platinum and Rhodium can easily be removed from the used up thermo-couple. Valuable components can be used several times.
6. The thermo-couple element can be transported without any problems.
7. The dimensions of the new thermo-couple are as they were previously. Thus, it can be used without changing the technology.
8. The costs of production are lower, since the mass of ceramic parts is less.
9. In spite of a large air space between the metal protective tube and the ceramic protective tube, the time constant of the new thermo-couple has not become detectibly larger. The reason for this is probably the fact that the badly conducting ceramic pieces have become thinner.
10. Within the new thermo-couple much less corrosion occurred between the protective tubes, than in the already known version.

I claim:

1. Thermocouple comprising an outer metal protective tube (1), an inner ceramic protective tube (3), and a positive thermo wire and a negative thermo wire, said wires being insulated from one another ceramically, characterized in that the outer diameter (d) of the ceramic protective tube (3) and the inner (D) diameter of the metal protective tube (1) are related to one another in the following way:

$1.5 \leq D/d < 3$ wherein D is the inner diameter of the metal protective tube and d is the outer diameter of the ceramic protective tube.

2. Thermo-couple according to claim 1, characterized in that the inner ceramic protective tube (3) is centered within the metal protective tube (1) by means of at least one ring (2) at that location of the thermo-couple, that is relatively cool during operation.

3. Thermo-couple according to claim 2, characterized in that the centering with the at least one ring (2) is adjusted so that the ceramic protective tube (3) touches the metal protective tube (1) at an inner top (4) of the metal protective tube (1) in a cold state.

4. Thermo-couple according to claim 1, characterized in that the positive thermo-wire is electrically insulated by means of a one hole insulation rod having a maximum wall thickness of about 0.5 mm.

5. Thermo-couple according to claim 1, characterized in that means are provided for centering the metal protective tube (1) within an argillaceous earth-graphite protective tube, said centering means being composed of a cone (5) and of a disc (6), whereby a closed end of the metal protective tube (1) remains spaced from a closed end of the argillaceous earth-graphite protective tube during operation.

6. Thermo-couple according to claim 1, characterized in that the negative thermo-wire is thicker than the positive thermo-wire, and a ratio of the diameters of both thermo-wires is chosen such that both have the same drift under the same conditions.

* * * * *